United States Patent
Luo et al.

(10) Patent No.: US 11,245,318 B1
(45) Date of Patent: Feb. 8, 2022

(54) RESOLVER CLAMPING PLATE FOR ELECTRIC MOTOR

(71) Applicant: Schaeffler Technologies AG & Co. KG, Herzogenaurach (DE)

(72) Inventors: Tuo Luo, Copley, OH (US); Matthew Payne, Glenmont, OH (US); Markus Steinberger, Sagamore Hills, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/942,236

(22) Filed: Jul. 29, 2020

(51) Int. Cl.
*H02K 24/00* (2006.01)
*H02K 11/225* (2016.01)
*G01D 5/20* (2006.01)

(52) U.S. Cl.
CPC ............. *H02K 24/00* (2013.01); *G01D 5/20* (2013.01); *H02K 11/225* (2016.01)

(58) Field of Classification Search
CPC ...... H02K 19/00; H02K 15/00; H02K 11/225; H02K 24/00; G01D 5/20; G01D 5/12; G01D 5/2046; Y10T 29/49012
USPC .................................. 310/68 B, 85, 91, 168
See application file for complete search history.

(56) References Cited

U.S. PATENT DOCUMENTS

| | | | | |
|---|---|---|---|---|
| 7,893,580 B2 * | 2/2011 | Kobayashi | ............. | H02K 29/12 310/68 B |
| 8,575,799 B2 * | 11/2013 | Fukui | ............. | H02K 11/225 310/68 B |
| 8,616,775 B2 * | 12/2013 | Watanabe | ............. | F16C 19/362 384/448 |
| 9,073,424 B2 * | 7/2015 | Vogler | ............. | B60B 3/16 |
| 9,488,462 B2 * | 11/2016 | Otobe | ............. | G01D 5/2046 |
| 9,577,499 B2 * | 2/2017 | Fulton | ............. | G01D 5/2046 |
| 10,012,267 B2 * | 7/2018 | Kegeler | ............. | H05K 3/46 |
| 10,352,422 B2 * | 7/2019 | Satyaseelan | ............. | H02K 7/006 |
| 10,465,780 B2 * | 11/2019 | Pyers | ............. | H02K 1/223 |
| 10,594,198 B2 * | 3/2020 | Nakano | ............. | H02K 3/522 |
| 11,108,285 B2 * | 8/2021 | Ikura | ............. | H02K 15/02 |
| 2009/0167121 A1 * | 7/2009 | Kobayashi | ............. | H02K 7/06 310/68 B |
| 2010/0254642 A1 * | 10/2010 | Watanabe | ............. | G01B 7/30 384/448 |

(Continued)

FOREIGN PATENT DOCUMENTS

| | | | | | |
|---|---|---|---|---|---|
| CN | 102771034 B | * | 3/2015 | ............. | H02K 1/185 |
| CN | 106537737 A | * | 3/2017 | ............. | H02K 11/00 |

(Continued)

OTHER PUBLICATIONS

U.S. Appl. No. 16/891,190.

*Primary Examiner* — Patrick Assouad
*Assistant Examiner* — Sean Curtis

(57) ABSTRACT

A two-piece resolver clamping plate includes a first clamping segment and a second clamping segment. The first clamping segment includes a first arcuate clamping ring and exactly three arcuate clamping arms extending from the first arcuate clamping ring. The second clamping segment includes a second arcuate clamping ring and exactly two arcuate clamping arms extending from the second arcuate clamping ring. In an example embodiment, a first circumferential length of the first arcuate clamping ring is greater than a second circumferential length of the second arcuate clamping ring.

15 Claims, 2 Drawing Sheets

(56) References Cited

U.S. PATENT DOCUMENTS

| | | | | |
|---|---|---|---|---|
| 2011/0239818 A1* | 10/2011 | Kasuya | ................... | B60L 50/16 74/665 A |
| 2012/0062077 A1* | 3/2012 | Isogai | ................... | B60L 50/16 310/68 B |
| 2012/0104902 A1* | 5/2012 | Fukui | ................... | H02K 11/225 310/68 B |
| 2013/0022302 A1* | 1/2013 | Watanabe | ............. | F16C 19/362 384/448 |
| 2014/0117744 A1* | 5/2014 | Vogler | ................ | B60K 7/0007 301/6.5 |
| 2015/0042322 A1* | 2/2015 | Otobe | ................. | G01D 5/2046 324/207.25 |
| 2015/0229178 A1* | 8/2015 | Murakami | ............... | H02K 3/38 310/71 |
| 2016/0218578 A1* | 7/2016 | Yamada | ............... | H02K 15/0068 |
| 2017/0152894 A1* | 6/2017 | Kegeler | ............... | G01D 5/2046 |
| 2018/0058559 A1* | 3/2018 | Pyers | ................... | B60K 6/387 |
| 2018/0062469 A1* | 3/2018 | Satyaseelan | ........... | F16D 33/18 |
| 2018/0323691 A1* | 11/2018 | Nakano | .................... | H02K 3/38 |
| 2019/0305614 A1* | 10/2019 | Ikura | ........................ | H02K 5/04 |
| 2020/0384846 A1* | 12/2020 | Ramsey | ................ | B60K 6/387 |
| 2021/0126497 A1* | 4/2021 | Ramsey | ................ | H02K 1/18 |
| 2021/0143717 A1* | 5/2021 | Steiner | .................... | F16H 45/02 |
| 2021/0273542 A1* | 9/2021 | Payne | .................. | H02K 11/225 |
| 2021/0308461 A1* | 10/2021 | Moses et al. | ......... | H04R 25/602 |

FOREIGN PATENT DOCUMENTS

| | | | | |
|---|---|---|---|---|
| CN | 110089005 A | * | 8/2019 | ............... H02K 1/30 |
| CN | 211183720 U | * | 8/2020 | |
| CN | 212158460 U | * | 12/2020 | |
| CN | 112470380 A | * | 3/2021 | ............... H02K 3/50 |
| CN | 112514207 A | * | 3/2021 | ............... H02K 3/28 |
| DE | 102018120370 A1 | * | 2/2020 | ............... H02K 24/00 |
| EP | 3051671 A1 | * | 8/2016 | ............... H02K 3/38 |
| EP | 3051671 B1 | * | 11/2018 | ......... H02K 15/0062 |
| KR | 20130131254 A | * | 12/2013 | |
| WO | WO-2015045949 A1 | * | 4/2015 | ............... H02K 3/28 |
| WO | WO-2018087887 A1 | * | 5/2018 | ............... F16M 1/04 |
| WO | WO-2021091753 A1 | * | 5/2021 | .......... H02K 11/225 |
| WO | WO-2021173764 A1 | * | 9/2021 | |

* cited by examiner

RESOLVER CLAMPING PLATE FOR ELECTRIC MOTOR

TECHNICAL FIELD

The present disclosure relates generally to an electric motor and more specifically to a resolver clamping plate for an electric motor.

BACKGROUND

Resolver stators secured to housings are known. One example is shown and described in U.S. Pat. No. 9,577,499 titled RESOLVER WITH MOUNTING STRUCTURE AND METHOD to Fulton et al.

SUMMARY

Example embodiments broadly comprise a two-piece resolver clamping plate including a first clamping segment and a second clamping segment. The first clamping segment includes a first arcuate clamping ring and exactly three arcuate clamping arms extending from the first arcuate clamping ring. The second clamping segment includes a second arcuate clamping ring and exactly two arcuate clamping arms extending from the second arcuate clamping ring. In an example embodiment, a first circumferential length of the first arcuate clamping ring is greater than a second circumferential length of the second arcuate clamping ring.

In some example embodiments, a first radial width of the first arcuate clamping ring and a second radial width of the second arcuate clamping ring are both greater than a third radial width of respective body portions of each of the exactly three arcuate clamping arms and the exactly two arcuate clamping arms. In some example embodiments, each of the exactly three arcuate clamping arms includes a respective distal end, opposite the first arcuate clamping ring, each of the exactly two arcuate clamping arms includes a respective distal end, opposite the second arcuate clamping ring, and each of the respective distal ends includes a respective mounting pad with a mounting hole. In an example embodiment, each respective mounting pad includes a fourth radial width greater than the third radial width. In an example embodiment, the second arcuate clamping ring includes a distal end with an inside edge tapering radially outward towards an outer edge.

In an example embodiment, the two-piece resolver clamping plate is formed from a material including a yield stress, and a stress level of the two-piece resolver clamping plate is less than or equal to 70% of the yield stress at a resolver clamping force of 1.7× a resolver stator required clamping force and 4.25× a designed resolver stator laminated thickness. In an example embodiment, a first one of the exactly three arcuate clamping arms extends from a first distal end of the first arcuate clamping ring, a second distal end of the first arcuate clamping ring, opposite the first distal end, extends circumferentially beyond a second one of the exactly three arcuate clamping arms, and a third one of the exactly three arcuate clamping arms is disposed circumferentially between the first one of the exactly three arcuate clamping arms and the second one of the exactly three arcuate clamping arms.

In an example embodiment, each of the exactly three arcuate clamping arms includes a respective distal end, opposite the first arcuate clamping ring, each of the exactly two arcuate clamping arms includes a respective distal end, opposite the second arcuate clamping ring, and each of the respective distal ends includes a respective mounting pad with a mounting hole. In an example embodiment, each of the exactly three arcuate clamping arms is disposed radially outside of the first arcuate clamping ring and each of the exactly two arcuate clamping arms is disposed radially outside of the second arcuate clamping ring.

In some example embodiments, each of the exactly three arcuate clamping arms includes a respective transition portion extending from the first clamping ring and each of the exactly two arcuate clamping arms includes a respective transition portion extending from the second clamping ring. In an example embodiment, each of the respective transition portions includes an arcuate shape.

Other example embodiments broadly comprise a resolver assembly for an electric motor including a housing, a laminated resolver stator, and the two-piece resolver clamping plate, fixed to the housing. The laminated resolver stator is disposed between the housing and the two-piece resolver clamping plate, and the first arcuate clamping ring and the second arcuate clamping ring are arranged to apply a resolver clamping force to clamp the laminated resolver stator against the housing. In an example embodiment, the two-piece resolver clamping plate is formed from a material comprising a yield stress, the laminated resolver stator includes a required clamping force and a laminated thickness, and a stress level of the resolver clamping plate is less than or equal to 70% of the yield stress at a resolver clamping force of 1.7× the required clamping force and 4.25× of the laminated thickness.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
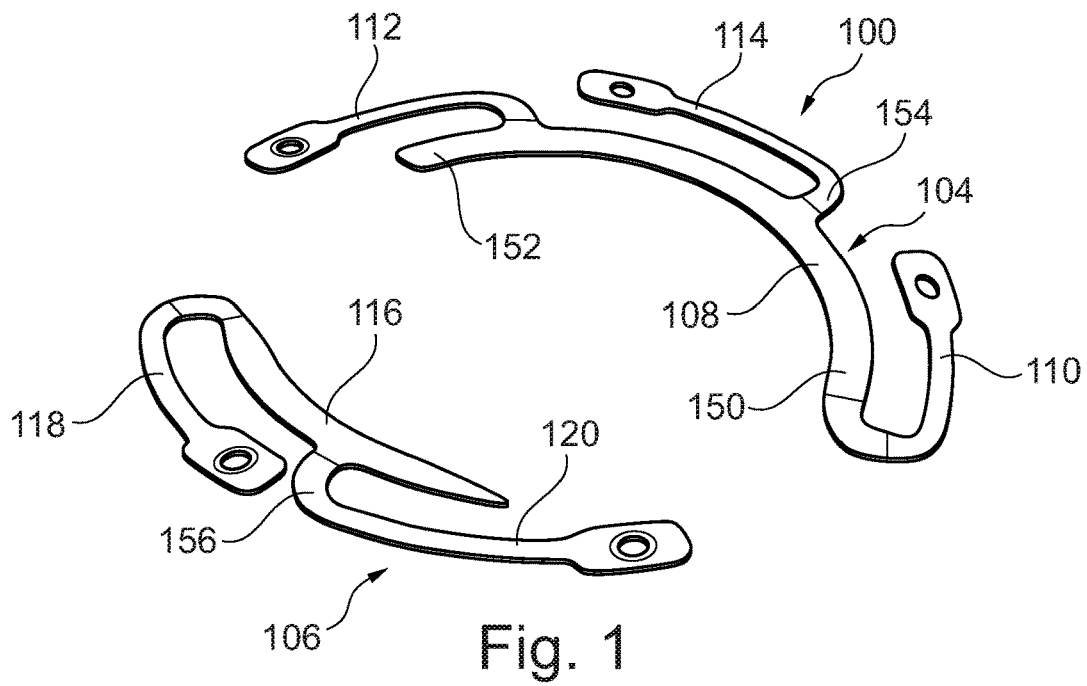
FIG. 1 illustrates a perspective view of a two-piece resolver clamping plate according to an example embodiment.
Figure 2:
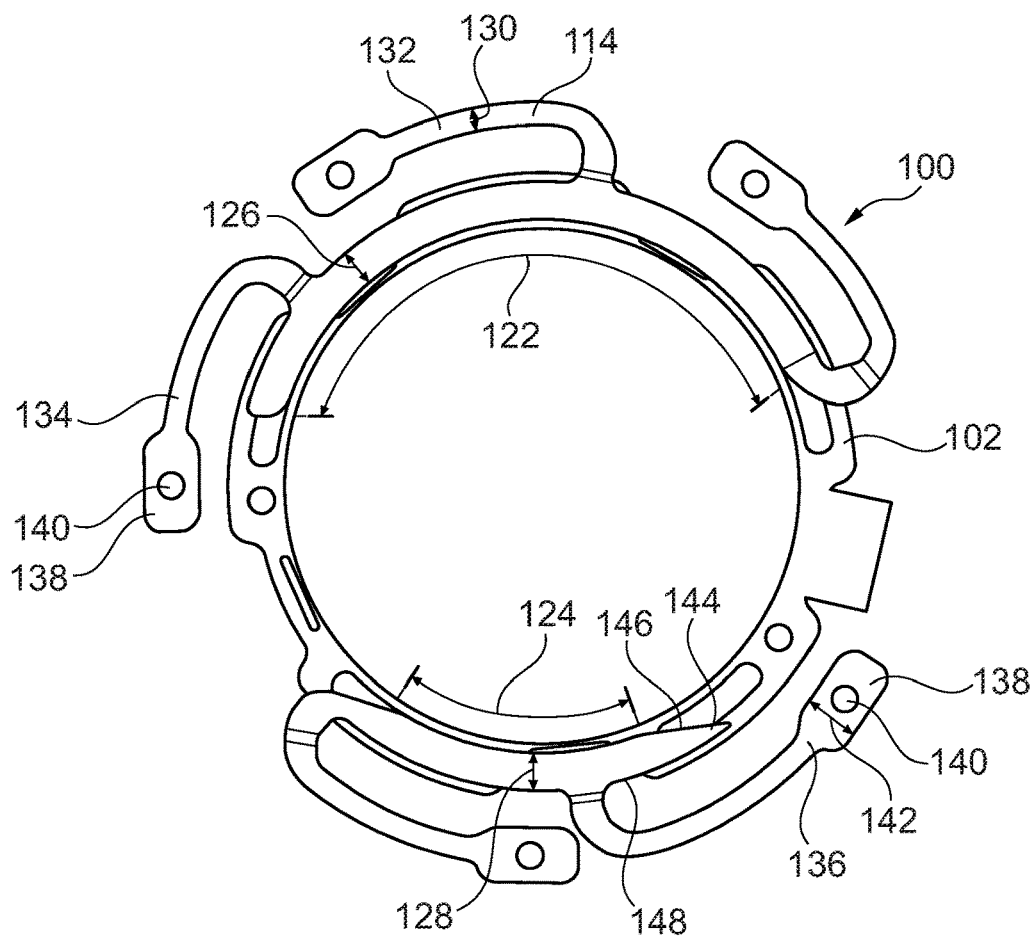
FIG. 2 illustrates a top view of the two-piece resolver clamping plate of FIG. 1 shown with a laminated resolver stator.
Figure 3:
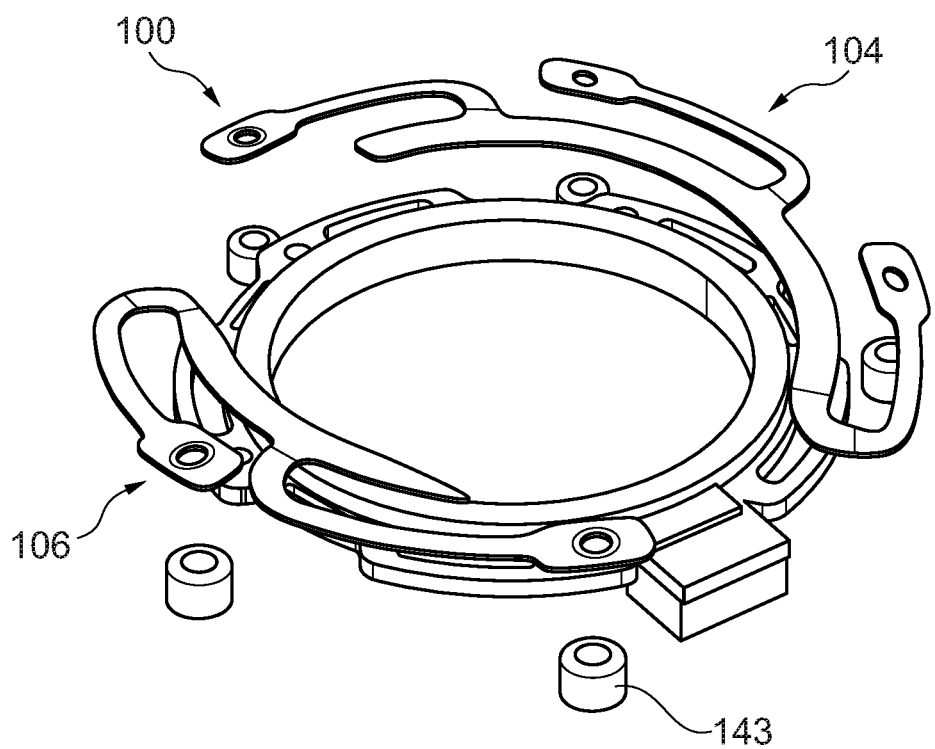
FIG. 3 illustrates a perspective exploded view of the two-piece resolver clamping plate and the laminated resolver stator of FIG. 2.

The following description is made with reference to FIGS. 1-4. FIG. 1 illustrates a perspective view of two-piece resolver clamping plate 100 according to an example embodiment. FIG. 2 illustrates a top view of the two-piece resolver clamping plate of FIG. 1 shown with laminated resolver stator 102. FIG. 3 illustrates a perspective exploded view of the two-piece resolver clamping plate and the laminated resolver stator of FIG. 2. Two-piece resolver clamping plate 100 includes clamping segments 104 and 106. Clamping segment 104 includes arcuate clamping ring 108 and arcuate clamping arms 110, 112, and 114 extending from arcuate clamping ring 108. In the example embodiment shown in FIG. 1, clamping segment 104 includes exactly three arcuate clamping arms. Clamping segment 106 includes arcuate clamping ring 116 and arcuate clamping arms 118 and 120 extending from arcuate clamping ring 116. In the example embodiment shown in FIG. 1, clamping segment 106 includes exactly two arcuate clamping arms.

As best shown in FIG. 2, circumferential length 122 of arcuate clamping ring 108 is greater than circumferential length 124 of arcuate clamping ring 116. Radial width 126 of arcuate clamping ring 108 and radial width 128 of arcuate clamping ring 116 are both greater than radial widths 130 of respective body portions 132 of arcuate clamping arms 110, 112, 114, 118, and 120. Arcuate clamping arms 110, 112, and 114 include respective distal ends 134, opposite arcuate clamping ring 108, and arcuate clamping arms 118 and 120 include respective distal ends 136, opposite arcuate clamping ring 116. Distal ends 134 and 136 comprise mounting pads 138 with mounting holes 140. Mounting pads 138 include radial width 142 greater than radial width 130. Optional spacers 143 (ref. FIG. 3) may be used between the mounting pads and a housing to position the two-piece resolver clamping plate. Arcuate clamping ring 116 includes distal end 144 with inside edge 146 tapering radially outward towards outer edge 148.

Two-piece resolver clamping plate 100 is formed from a material with a yield stress and a stress level of the two-piece resolver clamping plate is less than or equal to 70% of the yield stress at a resolver clamping force of 1.7× a resolver stator required clamping force and 4.25× a designed resolver stator laminated thickness. As an example, the two-piece resolver clamping plate may be made of 1075 steel with a yield stress of 1250 MPa. If the resolver stator required clamping force is 110 N at a laminated thickness of 2 mm than a stress of the two-piece resolver clamping plate is less than or equal to 850 MPa, or less than 70% of the yield stress of 1250 MPa.

Arcuate clamping arm 110 extends from first distal end 150 of arcuate clamping ring 108, and distal end 152 of arcuate clamping ring 108, opposite distal end 150, extends circumferentially beyond arcuate clamping arm 112. Arcuate clamping arm 114 is disposed circumferentially between arcuate clamping arm 110 and arcuate clamping arm 112.

Each of arcuate clamping arms 110, 112, and 114 is disposed radially outside of arcuate clamping ring 108 and each of arcuate clamping arms 118 and 120 is disposed radially outside of arcuate clamping ring 116. Arcuate clamping arms 110, 112 and 114 include a respective transition portion 154 extending from clamping ring 108 and each of arcuate clamping arms 118 and 120 include a respective transition portion 156 extending from clamping ring 116. Each of respective transition portions 154 and 156 comprises an arcuate shape.

Figure 4:
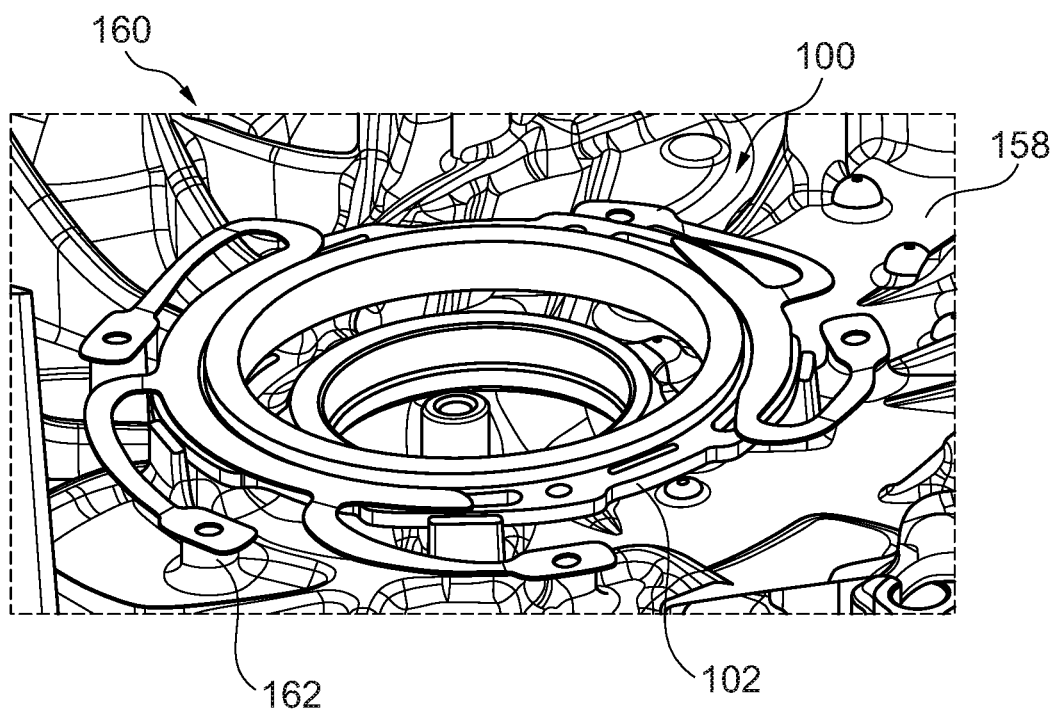
FIG. 4 illustrates a perspective view of the two-piece resolver clamping plate and the laminated resolver stator of FIG. 2 shown fixed to a housing.

The following description is made with reference to FIGS. 1-4. FIG. 4 illustrates a perspective view of two-piece resolver clamping plate 100 and laminated resolver stator 102 of FIG. 2 shown fixed to housing 158. Resolver assembly 160 includes housing 158, laminated resolver stator 102 and two-piece resolver clamping plate 100, fixed to the housing. Spacers 143 are replaced by housing bosses 162 in the embodiment shown in FIG. 4. Laminated resolver stator 102 is disposed between the housing and the two-piece resolver clamping plate. Arcuate clamping rings 108 and 116 are arranged to apply a resolver clamping force to clamp the laminated resolver stator against the housing. As discussed above, the two-piece resolver clamping plate is formed from a material including a yield stress and the laminated resolver stator includes a required clamping force and a laminated thickness. A stress level of the resolver clamping plate is less than or equal to 70% of the yield stress at a resolver clamping force of 1.7× the required clamping force and 4.25× of the laminated thickness.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Two-piece resolver clamping plate
102 Laminated resolver stator
104 Clamping segment (first)
106 Clamping segment (second)
108 Arcuate clamping ring (first)
110 Arcuate clamping arm
112 Arcuate clamping arm
114 Arcuate clamping arm
116 Arcuate clamping ring (second)
118 Arcuate clamping arm 120 Arcuate clamping arm
122 Circumferential length (first)
124 Circumferential length (second)
126 Radial width (first)
128 Radial width (second)
130 Radial width (third)
132 Body portions
134 Distal ends (arms 110, 112, 114)
136 Distal ends (arms 118, 120)
138 Mounting pads
140 Mounting holes
142 Radial width (fourth)
143 Spacers
144 Distal end (clamping ring 116)
146 Inside edge
148 Outside edge
150 Distal end (first)
152 Distal end (second)
154 Transition portion (arms 110, 112, 114)
156 Transition portion (arms 118, 120)
158 Housing
160 Resolver assembly
162 Housing boss

What is claimed is:

1. A two-piece resolver clamping plate, comprising:
a first clamping segment comprising:
 a first arcuate clamping ring; and
 exactly three arcuate clamping arms extending from the first arcuate clamping ring; and
a second clamping segment comprising:
 a second arcuate clamping ring; and
 exactly two arcuate clamping arms extending from the second arcuate clamping ring, wherein a first circumferential length of the first arcuate clamping ring is greater than a second circumferential length of the second arcuate clamping ring.

2. The two-piece resolver clamping plate of claim 1 wherein a first radial width of the first arcuate clamping ring and a second radial width of the second arcuate clamping ring are both greater than a third radial width of respective body portions of each of the exactly three arcuate clamping arms and the exactly two arcuate clamping arms.

3. The two-piece resolver clamping plate of claim 2 wherein:
each of the exactly three arcuate clamping arms comprises a respective distal end, opposite the first arcuate clamping ring;
each of the exactly two arcuate clamping arms comprises a respective distal end, opposite the second arcuate clamping ring; and
each of the respective distal ends comprises a respective mounting pad with a mounting hole.

4. The two-piece resolver clamping plate of claim 3 wherein each respective mounting pad comprises a fourth radial width greater than the third radial width.

5. The two-piece resolver clamping plate of claim 2 wherein the second arcuate clamping ring comprises a distal end with an inside edge tapering radially outward towards an outer edge.

6. The two-piece resolver clamping plate of claim 1 wherein:
the two-piece resolver clamping plate is formed from a material comprising a yield stress; and
a stress level of the two-piece resolver clamping plate is less than or equal to 70% of the yield stress at a resolver clamping force of 1.7× a resolver stator required clamping force and 4.25× a designed resolver stator laminated thickness.

7. The two-piece resolver clamping plate of claim 1 wherein:
a first one of the exactly three arcuate clamping arms extends from a first distal end of the first arcuate clamping ring;
a second distal end of the first arcuate clamping ring, opposite the first distal end, extends circumferentially beyond a second one of the exactly three arcuate clamping arms; and
a third one of the exactly three arcuate clamping arms is disposed circumferentially between the first one of the exactly three arcuate clamping arms and the second one of the exactly three arcuate clamping arms.

8. The two-piece resolver clamping plate of claim 1 wherein:
each of the exactly three arcuate clamping arms comprises a respective distal end, opposite the first arcuate clamping ring;
each of the exactly two arcuate clamping arms comprises a respective distal end, opposite the second arcuate clamping ring; and
each of the respective distal ends comprises a respective mounting pad with a mounting hole.

9. The two-piece resolver clamping plate of claim 1 wherein each of the exactly three arcuate clamping arms is disposed radially outside of the first arcuate clamping ring and each of the exactly two arcuate clamping arms is disposed radially outside of the second arcuate clamping ring.

10. The two-piece resolver clamping plate of claim 1 wherein each of the exactly three arcuate clamping arms comprises a respective transition portion extending from the first clamping ring and each of the exactly two arcuate clamping arms comprises a respective transition portion extending from the second clamping ring.

11. The two-piece resolver clamping plate of claim 10 wherein each of the respective transition portions comprises an arcuate shape.

12. A resolver assembly for an electric motor comprising:
a housing;
a laminated resolver stator; and
the two-piece resolver clamping plate of claim 1, fixed to the housing, wherein:
 the two-piece resolver clamping plate comprises:
  a first clamping segment comprising:
   a first arcuate clamping ring; and
   exactly three arcuate clamping arms extending from the first arcuate clamping ring; and
  a second clamping segment comprising:
   a second arcuate clamping ring; and
   exactly two arcuate clamping arms extending from the second arcuate clamping ring;
 the laminated resolver stator is disposed between the housing and the two-piece resolver clamping plate; and
 the first arcuate clamping ring and the second arcuate clamping ring are arranged to apply a resolver clamping force to clamp the laminated resolver stator against the housing.

13. The resolver assembly of claim 12, wherein:
the two-piece resolver clamping plate is formed from a material comprising a yield stress;
the laminated resolver stator comprises a required clamping force and a laminated thickness; and a stress level of the resolver clamping plate is less than or equal to 70% of the yield stress at a resolver clamping force of 1.7× the required clamping force and 4.25× of the laminated thickness.

14. A resolver assembly for an electric motor comprising:
a housing;
a laminated resolver stator; and
a resolver clamping plate, fixed to the housing, wherein:
   the resolver clamping plate comprises:
      a first clamping portion comprising:
         a first arcuate clamping ring; and
         exactly three arcuate clamping arms extending from the first arcuate clamping ring; and
      a second clamping portion comprising:
         a second arcuate clamping ring; and
         exactly two arcuate clamping arms extending from the second arcuate clamping ring;
   the laminated resolver stator is disposed between the housing and the resolver clamping plate; and
   the first arcuate clamping ring and the second arcuate clamping ring are arranged to apply a resolver clamping force to clamp the laminated resolver stator against the housing.

15. The resolver assembly of claim 14, wherein:
the resolver clamping plate is formed from a material comprising a yield stress;
the laminated resolver stator comprises a required clamping force and a laminated thickness; and
a stress level of the resolver clamping plate is less than or equal to 70% of the yield stress at a resolver clamping force of 1.7× the required clamping force and 4.25× of the laminated thickness.

* * * * *